(12) United States Patent
Albertson

(10) Patent No.: US 8,739,068 B2
(45) Date of Patent: May 27, 2014

(54) DYNAMIC USER INTERFACE FOR IN-DIAGRAM SHAPE SELECTION

(75) Inventor: Dan Albertson, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 11/763,656

(22) Filed: Jun. 15, 2007

(65) Prior Publication Data

US 2008/0313565 A1   Dec. 18, 2008

(51) Int. Cl.
*G06F 3/048* (2013.01)
*G06T 11/20* (2006.01)

(52) U.S. Cl.
USPC ............................ 715/825; 345/440; 345/441

(58) Field of Classification Search
USPC .................................. 715/825; 345/440, 441
See application file for complete search history.

(56) References Cited

U.S. PATENT DOCUMENTS

| | | | |
|---|---|---|---|
| 4,686,522 A | 8/1987 | Hernandez et al. | |
| 4,723,211 A | 2/1988 | Barker et al. | |
| 4,815,029 A | 3/1989 | Barker et al. | |
| 5,555,357 A | 9/1996 | Fernandes et al. | |
| 5,588,108 A * | 12/1996 | Kumar et al. | 715/765 |
| 5,600,779 A | 2/1997 | Palmer et al. | |
| 5,774,661 A | 6/1998 | Chatterjee et al. | |
| 5,786,816 A | 7/1998 | Macrae et al. | |
| 6,002,399 A | 12/1999 | Haine et al. | |
| 6,029,172 A | 2/2000 | Jorna et al. | |
| 6,154,756 A | 11/2000 | Hearn et al. | |
| 6,239,813 B1 | 5/2001 | Erskine | |
| 6,243,092 B1 | 6/2001 | Okita et al. | |
| 6,246,411 B1 | 6/2001 | Strauss | |
| 6,289,513 B1 | 9/2001 | Bentwich | |
| 6,384,851 B1 | 5/2002 | Takasu et al. | |
| 6,393,425 B1 | 5/2002 | Kelly | |

(Continued)

FOREIGN PATENT DOCUMENTS

| | | |
|---|---|---|
| EP | 0947911 A2 | 10/1999 |
| JP | 7-282003 | 10/2012 |
| WO | WO2004063862 A2 | 7/2004 |

OTHER PUBLICATIONS

Rekimoto, "Pick-and-Drop: A Direct Manipulation Technique for Multiple Computer Environments", Sony Computer Science Laboratories Inc., pp. 8.

(Continued)

*Primary Examiner* — Boris Pesin
*Assistant Examiner* — Matthew Ell
(74) *Attorney, Agent, or Firm* — Steve Crocker; Jim Ross; Micky Minhas

(57) ABSTRACT

Technologies are described herein for providing a dynamic user interface (UI) to allow a user to select an active diagram shape for insertion into a flowchart or other diagram without leaving the drawing canvas. Through the use of the embodiments presented herein, a diagramming application provides a user with a dynamic UI within the drawing canvas that includes a selection of diagram shapes from a shape gallery located adjacent to the drawing canvas. Using the dynamic UI, the user may select and insert a shape into the diagram without leaving the canvas. Additionally, the user may select a replacement shape from the dynamic UI for replacing an existing diagram shape without leaving the drawing canvas. The dynamic UI is triggered for display next to a cursor when the cursor hovers over or navigates in proximity to a diagram shape, a connection control, or any other UI trigger.

9 Claims, 8 Drawing Sheets

(56) References Cited

U.S. PATENT DOCUMENTS

| | | |
|---|---|---|
| 6,628,285 B1 | 9/2003 | Abeyta et al. |
| 6,697,087 B1 | 2/2004 | Kelly |
| 6,715,127 B1 | 3/2004 | Eschbach et al. |
| 6,725,428 B1 | 4/2004 | Pareschi et al. |
| 6,751,780 B1 | 6/2004 | Neff et al. |
| 6,851,089 B1 | 2/2005 | Erikson et al. |
| 6,931,288 B1 | 8/2005 | Lee et al. |
| 7,047,502 B2 | 5/2006 | Petropoulos et al. |
| 7,093,192 B2* | 8/2006 | Mullen et al. .................. 715/202 |
| 7,117,449 B1 | 10/2006 | Levin et al. |
| 7,137,077 B2 | 11/2006 | Iwema et al. |
| 7,503,012 B2 | 3/2009 | Chen et al. |
| 7,685,527 B2 | 3/2010 | Yan et al. |
| 7,698,635 B2 | 4/2010 | Grigoriadis et al. |
| 7,721,200 B2 | 5/2010 | Grigoriadis et al. |
| 7,721,201 B2 | 5/2010 | Grigoriadis et al. |
| 2003/0076364 A1 | 4/2003 | Martinez et al. |
| 2003/0158832 A1 | 8/2003 | Sijacic et al. |
| 2004/0119763 A1 | 6/2004 | Mizobuchi et al. |
| 2004/0261029 A1 | 12/2004 | Skjaervik |
| 2005/0028094 A1* | 2/2005 | Allyn ........................... 715/526 |
| 2005/0108620 A1* | 5/2005 | Allyn et al. .................... 715/500 |
| 2005/0149882 A1 | 7/2005 | Iwema et al. |
| 2005/0254859 A1 | 11/2005 | Kim et al. |
| 2006/0036964 A1* | 2/2006 | Satterfield et al. ............ 715/777 |
| 2006/0259872 A1* | 11/2006 | Mullen et al. .................. 715/764 |
| 2007/0036403 A1* | 2/2007 | Albertson et al. ............ 382/128 |
| 2007/0101321 A1 | 5/2007 | Mahoney et al. |
| 2007/0118793 A1 | 5/2007 | Arora et al. |
| 2008/0109472 A1 | 5/2008 | Underwood et al. |
| 2008/0147634 A1 | 6/2008 | Diaz et al. |
| 2008/0148164 A1 | 6/2008 | Read |
| 2008/0148188 A1 | 6/2008 | Read |
| 2008/0148192 A1 | 6/2008 | Read et al. |
| 2008/0270932 A1 | 10/2008 | Diaz et al. |
| 2009/0199123 A1 | 8/2009 | Albertson et al. |
| 2010/0122192 A1 | 5/2010 | Hanna |

OTHER PUBLICATIONS

International Search Report dated Nov. 27, 2008 in International Application No. PCT/US2008/065462.

U.S. Official Action dated Dec. 6, 2010 in U.S. Appl. No. 12/025,048.

"The Fastest Way to Make Great Looking Flow Charts", retrieved Jan. 2, 2008 from http://breezetree.com/flowcharting-software/, 5 pages.

Tooke, "Creating Effective UML Diagrams has never been Easier", Nov. 10, 2005, , retrieved Jan. 2, 2008 from http://www.ibm.com/developerworks/rational/library/1011_tooke/, 5 pages.

"Create Flowcharts and Block Diagrams using Microsoft Office Visio 2007", Microsoft Office Visio, 2007, Microsoft Corporation, retrieved Jan. 2, 2008 from http://office.microsoft.com/en-us/visio/HA102140011033.aspx?mode=print, 6 pages.

"EDGE Diagrammer 5.08.1831", 1997-2007, Super Shareware, retrieved Jan. 2, 2008 from http://www.supershareware.com/info/edge-diagrammer.html, 3 pages.

"RFFlow Professional Flowcharting", retrieved Jan. 2, 2008 from http://www.sharewareconnection.com/rfflow-professional-flow-charting.htm, 3 pages.

Landy et al., Borland JBuilder Developer's Guide, Published Dec. 18, 2002, excerpts from chap. 2, Safari Books Online, pp. 7-11.

U.S. Official Action dated Mar. 8, 2012 in U.S. Appl. No. 12/025,048.

Biafore, Visio 2007 Bible, John Wiley and Sons Publishing, Apr. 2, 2007, Chapter 4, sec. 1, 2, and 8; Chapter 5 "Connecting Shapes".

Japanese Official Action dated Apr. 27, 2012 in Japanese Application No. 2010-512261.

U.S. Official Action dated Aug. 20, 2012 in U.S. Appl. No. 12/025,048.

European Search Report dated Sep. 5, 2013 in European Application No. EP 08756580.0.

Chinese Office Action dated Jun. 15, 2011 in Chinese Application No. 200880020260.8.

Rekimoto, "MultipleComputer User Interfaces: "Beyond the Desktop" Direct Manipulation Environments", Sony Computer Science Laboratories Inc., 2000, pp. 2.

U.S. Notice of Allowance dated Nov. 22, 2013 in U.S. Appl. No. 12/025,048.

U.S. Official Action dated Jun. 2, 2011 in U.S. Appl. No. 12/025,048.

Rekimoto, "Pick-and-Drop: A Direct Manipulation Technique for Multiple Computer Environments", 1997, ACM Symposium on User Interface Software and Technology, 8 pages.

U.S. Official Action dated Jul. 16, 2013 in U.S. Appl. No. 12/025,048.

* cited by examiner

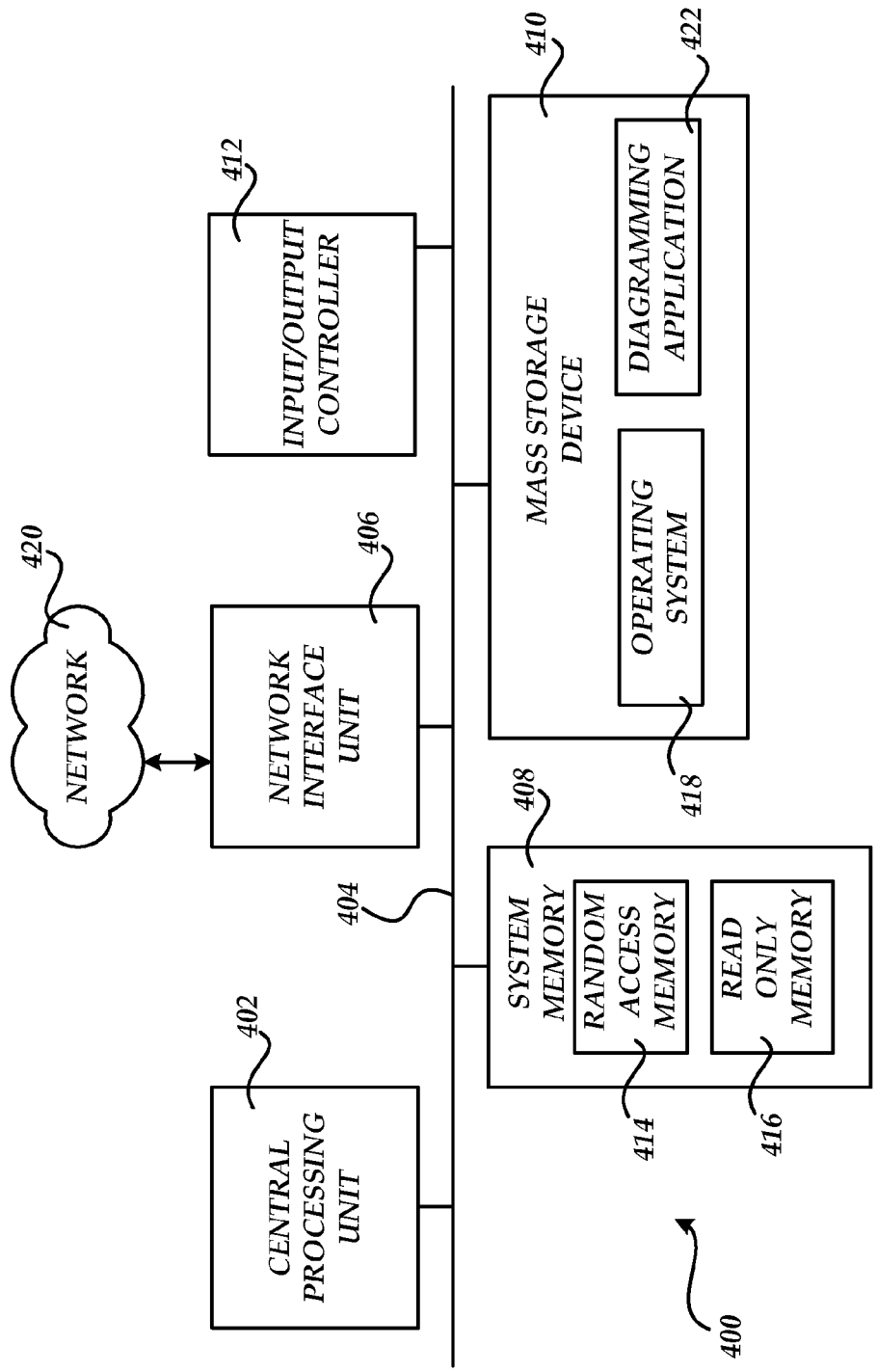

DYNAMIC USER INTERFACE FOR IN-DIAGRAM SHAPE SELECTION

BACKGROUND

Many diagramming applications allow for the creation of a flowchart to illustrate a business process. Specific shapes are often used in the flowchart to identify various types of steps within the process. For example, a rectangle may identify an action step in the process, while a diamond represents a decision step in the process. To create a flowchart using a diagramming application, a user typically is presented with a shape gallery that includes a number of shapes commonly used in a flowchart. The shape gallery is located in an area adjacent to, but separate from, the canvas on which the flowchart is being created. The user may then select a desired shape and drag the shape onto the canvas to the desired location within the flowchart. To add additional shapes, the user must repeat the process of moving the cursor to the shape gallery, selecting the desired shape, and dragging the shape into place on the drawing canvas.

Another method of adding a shape to a flowchart includes selecting a shape from a shape gallery as described above. After dragging the first shape of a process diagram from the shape gallery onto the drawing canvas, the user may continue to add subsequent shapes that are identical to the shape selected from the shape gallery to the flowchart by selecting a specific object or control on the drawing canvas. For example, the MICROSOFT OFFICE VISIO 2007 diagramming application from MICROSOFT CORPORATION of Redmond, Wash., utilizes connection controls that appear when a mouse cursor is hovered over a diagram shape. When one of the connection controls is then selected, a diagram shape identical to the selected diagram shape in the shape gallery is placed in the flowchart at the location indicated by the utilized connection control and a connector is inserted to connect the adjacent shapes.

Similarly, to change a diagram shape, a user may select the diagram shape on the canvas for which the change is to be made, and then select the desired diagram shape from the shape gallery. For example, to change an action step to a decision step, the user selects the action step on the drawing canvas and then selects the decision step from the shape gallery. In response, the rectangular-shaped action step changes to a diamond-shaped decision step. In each method outlined above, the user is required to leave the drawing canvas with the mouse cursor in order to select the desired diagram shape from the shape gallery. Because diagramming is often a rapid process, leaving the drawing canvas for any reason may cause a decrease in efficiency.

It is with respect to these considerations and others that the disclosure made herein is provided.

SUMMARY

Technologies are described herein for providing a dynamic user interface (UI) to allow a user to select and change diagram shapes without leaving the drawing canvas of a flowchart or other diagram. Through the utilization of the concepts presented herein, a diagramming application, or other type of application program, provides a dynamic UI in close proximity to a cursor when the cursor is moved over a particular control within the diagram. Utilizing this dynamic UI, the user may change an active diagram shape to a different shape according to the controls provided by the dynamic UI, without leaving the drawing canvas.

According to one aspect presented herein, a diagramming application determines that a cursor is proximate to a UI trigger on the drawing canvas. The UI trigger may be a diagram shape or a connection control. The connection control allows for a selected diagram shape to be inserted into the diagram and connected to an adjacent diagram shape. In response to determining that the cursor is proximate to the UI trigger, the diagramming application displays a dynamic UI on the drawing canvas and subsequently receives a selection of a UI shape control via the dynamic UI. The diagramming application then sets an active diagram shape according to the selection of the UI shape control and displays the active diagram shape on the drawing canvas.

According to implementations, the dynamic UI that is presented on the drawing canvas includes selectable shape controls corresponding to multiple diagram shapes available for placement within the diagram. The specific shape controls and corresponding diagram shapes are selected according to the diagram shapes available in a shape gallery adjacent to the drawing canvas. The shape controls available via the dynamic UI may directly correlate with the diagram shapes in the shape gallery or may be a selection from the available shapes in the shape gallery.

Aspects further include displaying a dynamic UI having selectable UI shape controls corresponding to multiple diagram shapes available for placement within a diagram on a drawing canvas. A selection of a UI shape control is received and an active diagram shape is set accordingly. The active diagram shape is then displayed on the drawing canvas. Embodiments include determining that a cursor is proximate to the active diagram shape and in response, displaying a dynamic UI on the drawing canvas. A selection of a secondary UI shape control is received via the dynamic UI and the active diagram shape is replaced with a diagram shape corresponding to the selection of the secondary UI shape control.

It should be appreciated that although the implementations described herein are presented in the context of a diagramming application, any type of program that creates or displays visual representations of a process may utilize the concepts presented herein. The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a computer architecture diagram showing an illustrative computer hardware and software architecture for a computing system capable of implementing the embodiments presented herein.

DETAILED DESCRIPTION

Figure 1A:
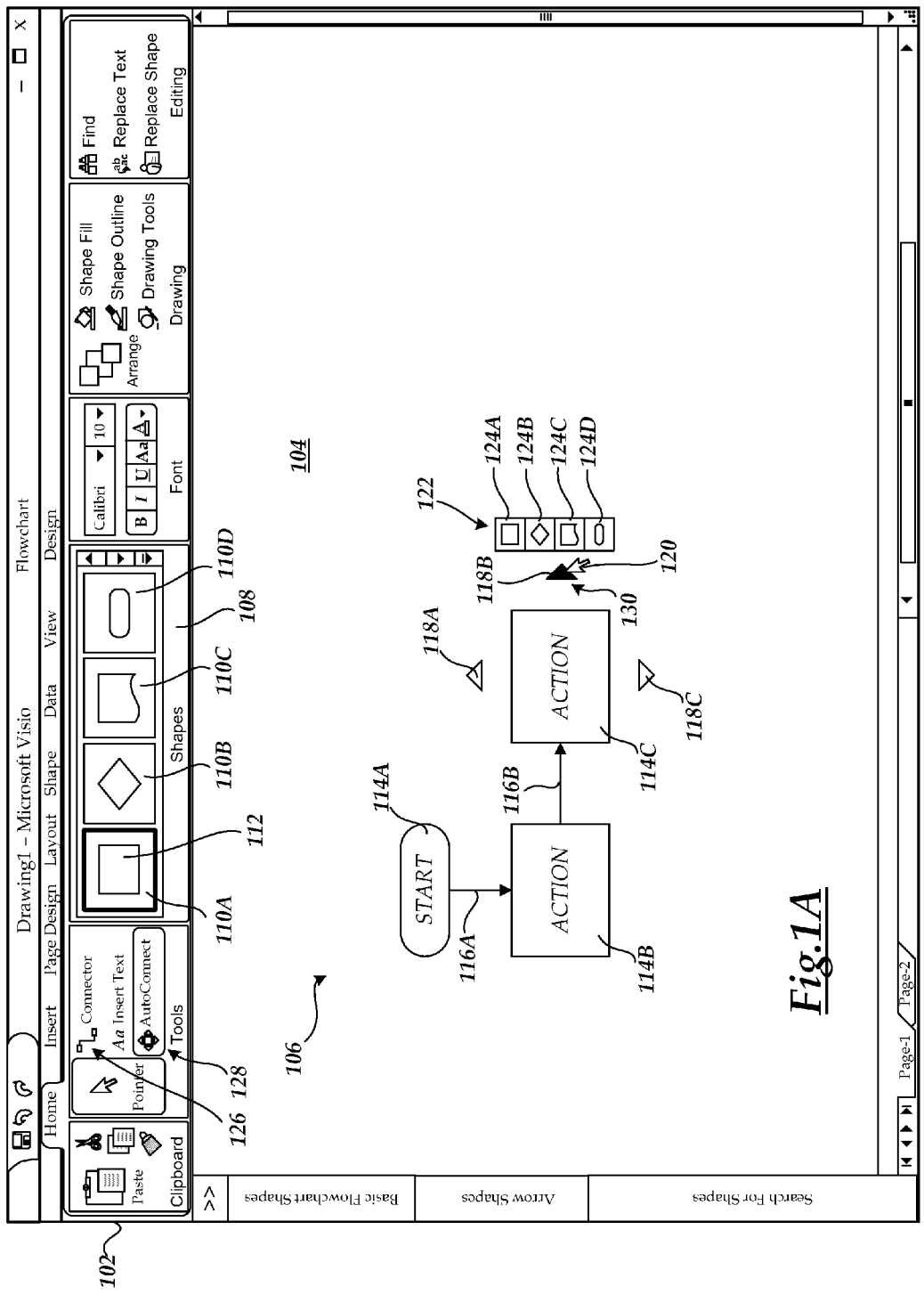
FIGS. 1A-1C are screen diagrams showing one implementation provided herein for changing the active diagram shape selection when adding a diagram shape to a diagram.
Figure 1B:
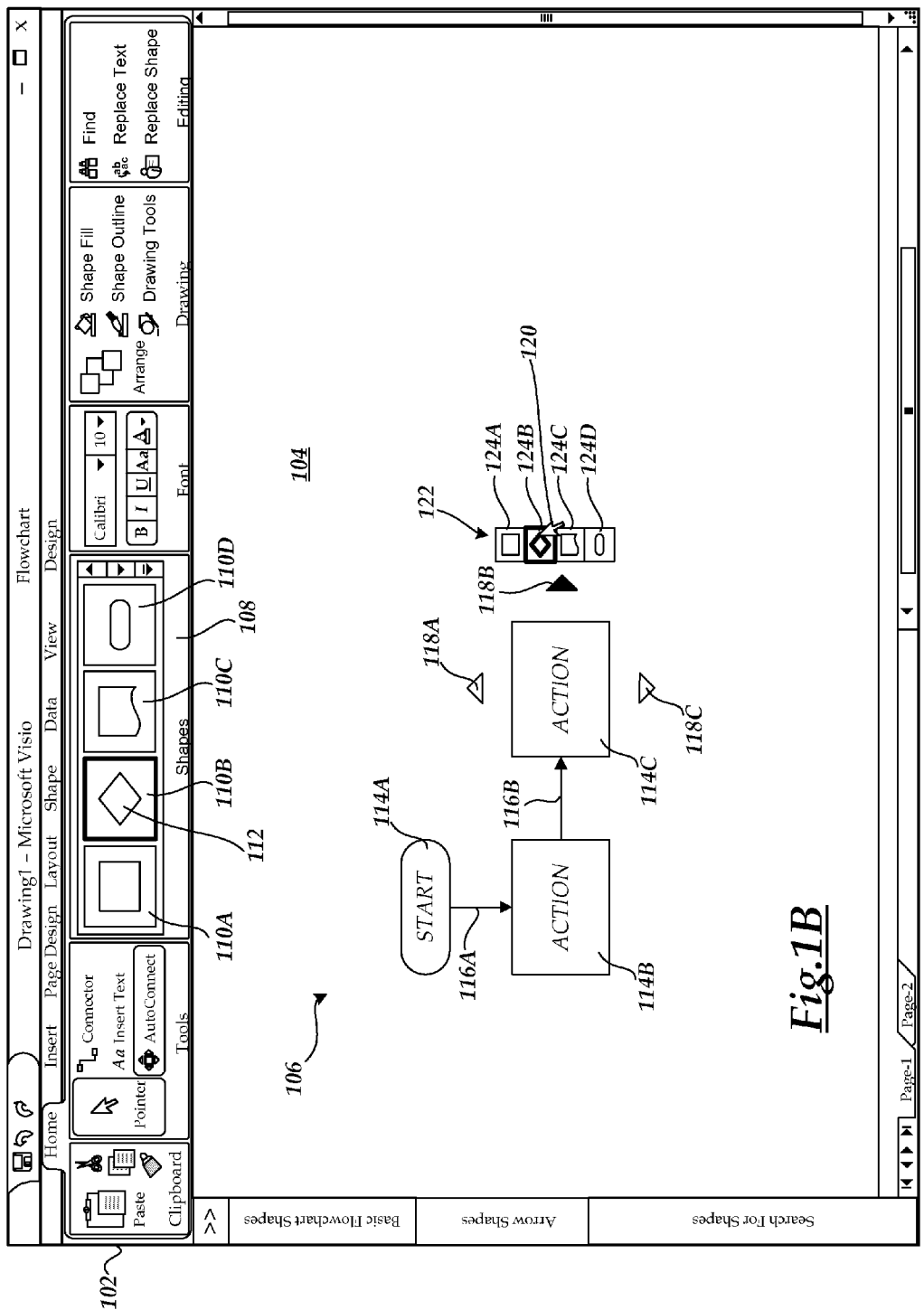

The following detailed description is directed to technologies for providing a dynamic UI to allow a user to change the active diagram shape to be inserted into a flowchart or other diagram without leaving the drawing canvas. Through the use of the embodiments presented herein, a diagramming application, or other type of application program, can provide a user with a dynamic UI within the drawing canvas. The dynamic UI includes a selection of diagram shapes that corresponds to diagram shapes within a shape gallery located adjacent to the drawing canvas. Using the dynamic UI, the user may select an active shape and insert the shape into the diagram without leaving the canvas.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Aspects of the various implementations will first be described with respect to FIGS. 1A-2B, which show sample screen diagrams from a diagramming application. While the diagramming application described herein is the MICROSOFT OFFICE VISIO 2007 diagramming application, it should be appreciated that the disclosure is equally applicable to all diagramming applications capable of creating and displaying a diagram. It should also be understood that although the disclosure provided herein is described in the context of creating and editing a flowchart, the disclosure is equally applicable to creating or editing any other type of diagram, such as a network diagram.

Referring now to the drawings, in which like numerals represent like elements through the several figures, aspects of a computing system and methodology for changing diagram shapes in a diagram will be described. In particular, FIG. 1 shows an illustrative sample diagram 106, created using a diagramming application. The diagram 106 was created on a drawing canvas 104 of a diagram page 102. The diagram 106 includes multiple process operations, represented by diagram shapes 114A-114C, as well as connectors 116A and 116B. As discussed briefly above, specific shapes are often used in a flowchart to identify various types of steps within the process. For example, a rectangle may identify an action step in the process, while a diamond represents a decision step in the process.

To illustrate how a diagram 106 is typically created, it is helpful to describe the diagram page 102 shown in FIG. 1A. The diagram page 102 includes the drawing canvas 104 and a number of controls located adjacent to the drawing canvas 104. A shape gallery 108 is one control area that is located adjacent to the drawing canvas 104. The shape gallery 108 provides gallery shape controls 110A-110 corresponding to four different diagram shapes that are most commonly used when creating a diagram. It should be appreciated that the shape gallery may be all-inclusive, containing a gallery shape control 110 corresponding to every available diagram shape provided by the diagramming application, or may contain any number of diagram shapes corresponding to commonly used or user-specified diagram shapes.

A first method for creating the diagram 106 utilizing the shape gallery 108 includes selecting a desired gallery shape control 110 with a cursor 120 and dragging and dropping each diagram shape 114 from the shape gallery 108 onto the drawing canvas 104. The user would then select a connector control 126 and drag and drop each connector 116 onto the drawing canvas 104 and connect them between the diagram shapes 114A-114C. To facilitate this process, the MICROSOFT OFFICE VISIO 2007 diagramming application provides an auto-connect control 128. When selected, the auto-connect control 128 allows the user to select one of the gallery shape controls 110A-110D to identify an active diagram shape 112. In FIG. 1A, the rectangle shape representing an action step is selected as the active diagram shape 112. Once a diagram shape 114 has been placed on the drawing canvas 104 through a method such as the drag-and-drop method described above, then the user may move the cursor 120 in a position proximate to, or may hover over, any of the diagram shapes 114A-114C to trigger the diagramming application to display connection controls 118A-118C around the diagram shape. It should be appreciated that the term "proximate" as used throughout this disclosure in describing the movement of the cursor 120 with respect to any other diagram component includes movement of the cursor 120 in close proximity to the diagram component, as well as movement of the cursor 120 that equates to hovering over the diagram component.

The connection controls 118A-118C identify the available placement locations for the next diagram shape 114 to be inserted into the diagram 106. The connection controls 118A-118C provide selectable indicators representing each direction surrounding a diagram shape 114 in which another diagram shape 114 may be added and connected. For example, the connection control 118A indicates to the user that a diagram shape 114 may be placed above the diagram shape 114C. If the user selects the connection control 118A when the gallery shape control 110A corresponding to the rectangular diagram shape is selected as the active diagram shape 112, then the diagramming application will place an action step directly above the diagram shape 114C in the diagram 106 and connect the new action step to the diagram shape 114C with an arrow proceeding from the diagram shape 114C to the new action step.

While the auto-connect process may allow for increased efficiency when compared to the drag-and-drop method of creating a diagram 106, both methods require the user to move the cursor 120 from the drawing canvas 104 to the shape gallery 108 in order to select a different gallery shape control 110 and change the active diagram shape 112. According to implementations provided herein, the user may navigate the cursor 120 over a connection control 118 corresponding to the desired direction of placement for the next diagram shape 114 to be placed within the diagram 106. As a result of this action, the user will be provided with a dynamic UI 122 that will allow the user to select a different active diagram shape 112 in order to change the type of the next diagram shape 114 to be placed in the diagram 106.

FIG. 1A shows an example in which a diagram 106 is being created. The current active diagram shape 112 is a rectangle, representing an action step. The active diagram shape 112 was previously set by the user when the user selected the gallery shape control 110A, presumably when placing the diagram shape 114B in the diagram 106. After adding the diagram shape 114C to the diagram 106, the user would like to place a decision step directly to the right of the diagram shape 114B. Rather than navigate off of the drawing canvas 104 to select the gallery shape control 110B corresponding to the triangular decision step shape, embodiments provide for the triggering of the dynamic UI 122. In this example, the connection control 118B, shown to be highlighted as the cursor 120 hovers over it, acts as a UI trigger 130 for the dynamic UI 122. The UI trigger 130 may be any component of the diagram 106 that is designated by the diagramming application to trigger the dynamic UI 122. While the UI trigger 130 is a connection control 118B in the example shown in FIG. 1A, as will be described below with respect to FIG. 2A, the UI trigger 130 may also be a diagram shape 114.

The dynamic UI 122 is described as being dynamic since it may appear at any location within the drawing canvas 104 in which the cursor 120 has engaged a UI trigger 130. The dynamic UI 122 may be presented at any position on the drawing canvas 104 surrounding the cursor 120, but is preferably positioned close enough to the cursor 120 and corresponding UI trigger 130 such that the navigation distance between the UI trigger 130 and the dynamic UI 122 is minimal. The dynamic UI 122 is shown to include four UI shape controls 124A-124D, corresponding to the four gallery shape controls 110A-110D located in the shape gallery 108. It should be understood that the dynamic UI 122 may include any number and type of controls other than the UI shape controls 124A-124D. Additionally, the UI shape controls 124A-124D may be identical to the quantity and type of gallery shape controls 110A-110D, or may include a smaller subset of the gallery shape controls 110A-110D located within the shape gallery 108.

Once the dynamic UI 122 has been triggered and displayed proximate to the cursor 120, the user may navigate the cursor 120 over the dynamic UI 122 and select the UI shape control 124 corresponding to the desired diagram shape of the next component of the diagram 106 being created. The selected UI shape control 124 will set the active diagram shape 112 for subsequent diagram shape 114 additions to the diagram 106. For example, looking at FIG. 1B, because the user wants to add a decision step to the right of the diagram shape 114C, the user navigates the cursor 120 over the dynamic UI 122 and selects the UI shape control 124B corresponding to the diamond-shaped decision step. After selecting the UI shape control 124B, then the gallery shape control 110B is highlighted as the active diagram shape 112.

Figure 1C:
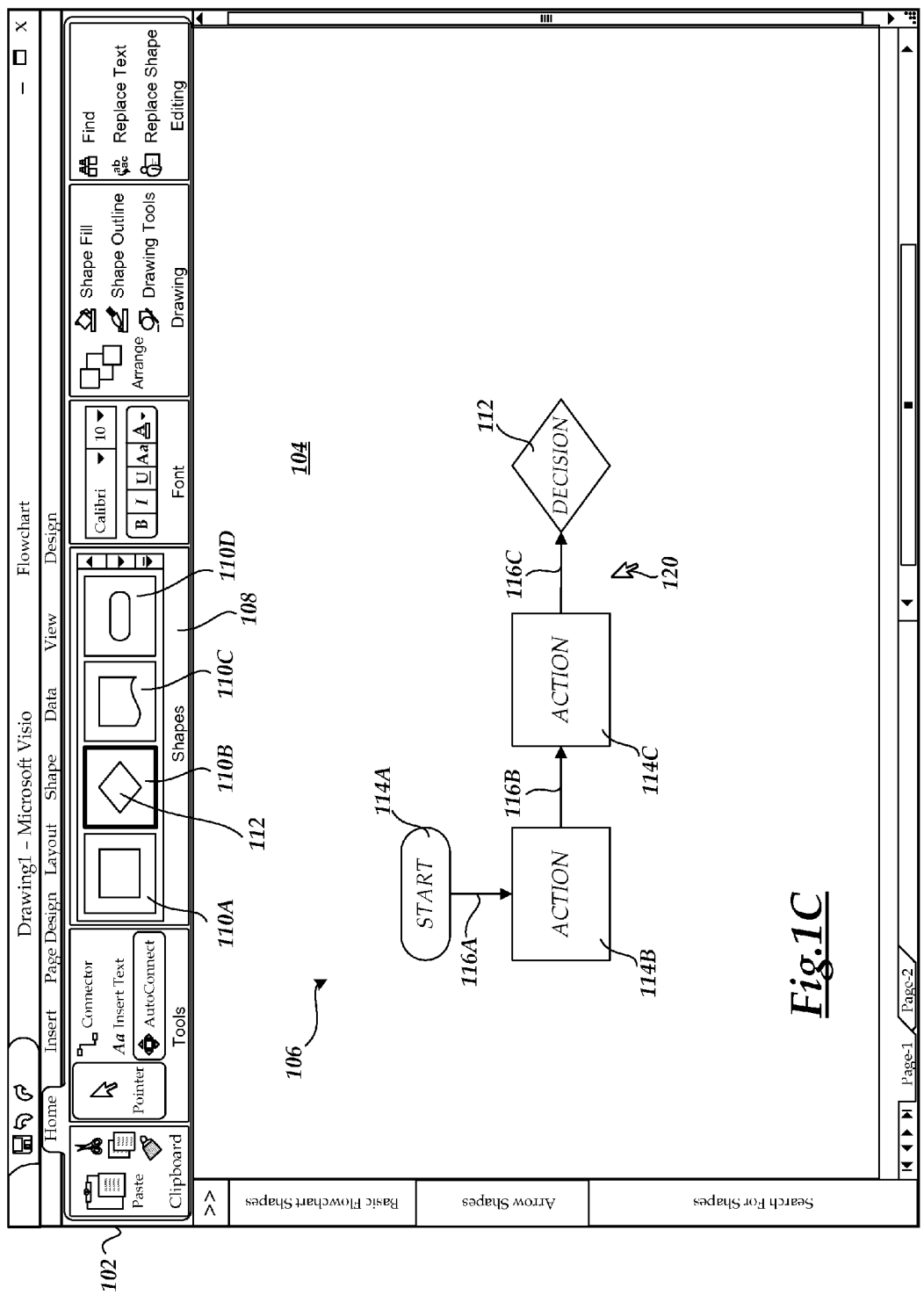

According to one embodiment, the selection of the UI shape control 124B places a decision step and appropriate connector in place within the diagram 106 and sets the active diagram shape 112 as the gallery shape control 110B for subsequent diagram shape 114 additions. FIG. 1C shows the resulting active diagram shape 112 placed within the diagram 106 and the corresponding connector 116C. Alternatively, the selection of the UI shape control 124B only sets the active diagram shape 112 as the gallery shape control 110B for subsequent diagram shape 114 additions. An additional selection of the connection control 118B would be required to place the desired decision step in place within the diagram 106. According to yet another alternative, the selection of the UI shape control 124B places the decision step and appropriate connector in place within the diagram 106, but does not change set the active diagram shape 112 to the gallery shape control 110B. This alternative would be desirable if the user primarily utilizes a single type of diagram shape 114 and only occasionally needs to insert a different type of diagram shape 114. These alternative embodiments may be established as primary embodiments according to user-defined preferences of the diagramming application.

Figure 2A:
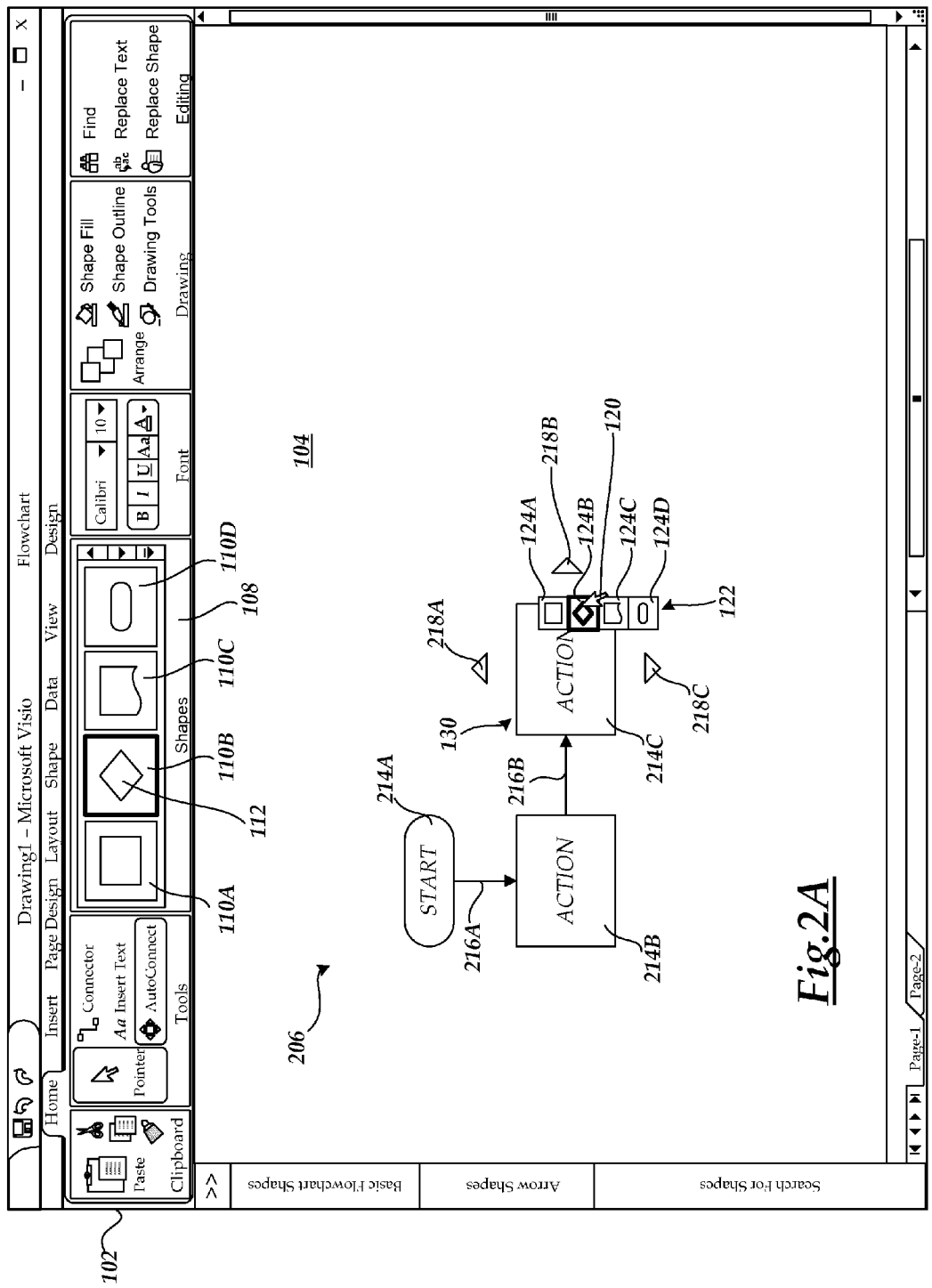
FIGS. 2A-2B are screen diagrams showing a further embodiment provided herein for changing an existing diagram shape within a diagram.

Implementations of the disclosure provided herein additionally provide the user with the capability to change the shape of an existing diagram shape within a diagram. FIG. 2A shows an example diagram 206 that is being created within the drawing canvas 104 of the diagram page 102. The diagram 206 includes the diagram shapes 214A-214C and corresponding connectors 216A and 216B. Assume that the user decides that the diagram shape 214C should be a diamond to represent a decision step rather than a rectangle to represent an action step. The user could select the diagram shape 214C and then navigate to the shape gallery 108 to select the gallery shape control 110B in order to effectuate the change. However, implementations provided herein allow the user to make the desired change without leaving the drawing canvas 104.

Figure 2B:
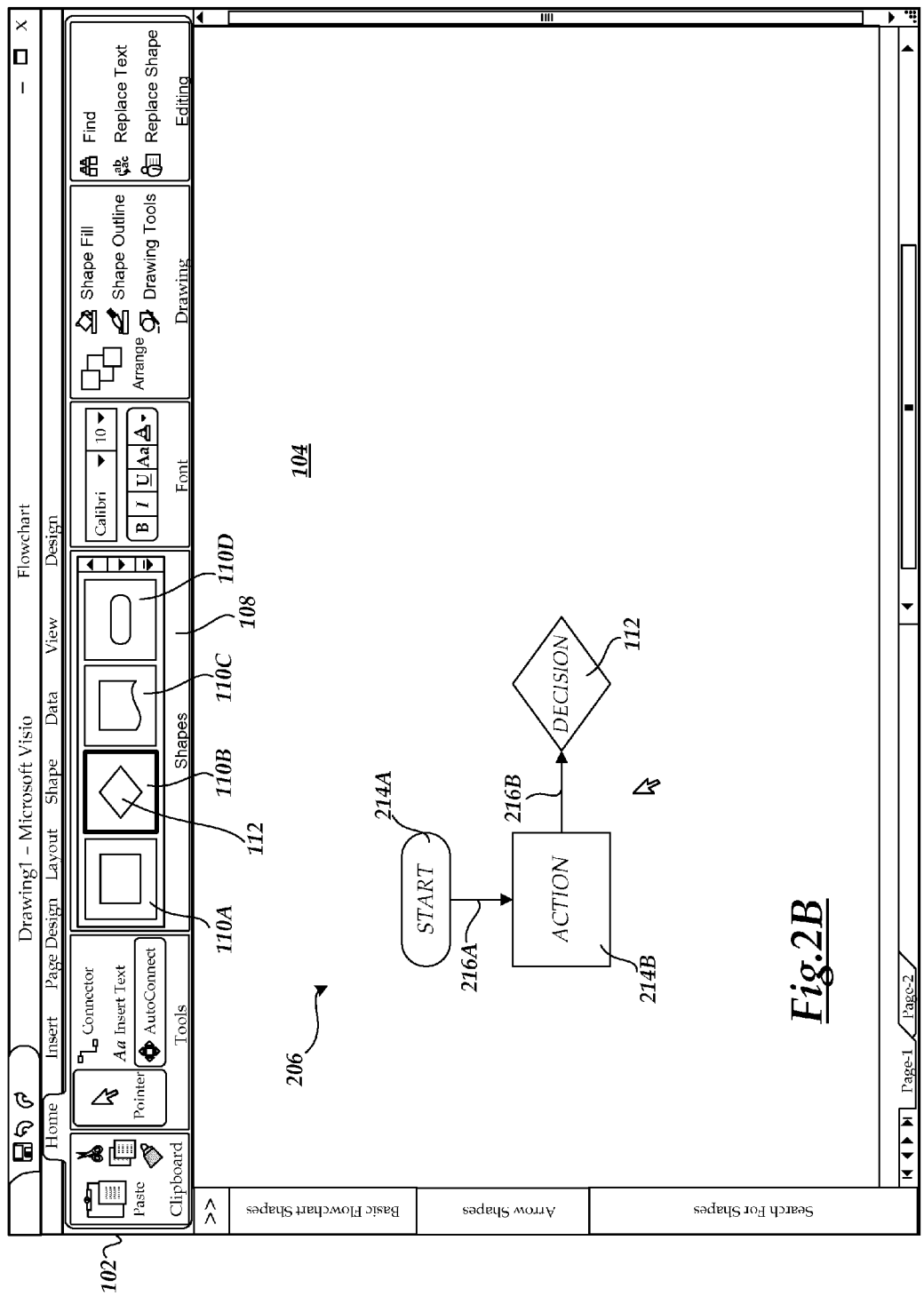

In this embodiment, the diagram shape 214C acts as the UI trigger 130. When the user navigates the cursor 120 over the diagram shape 214C, the diagramming application detects the movement over the UI trigger 130 and displays the dynamic UI 122 in a location that is proximate to the cursor 120 and/or the UI trigger 130. To replace the diagram shape 214C with a diamond-shaped decision step, the user selects the UI shape control 124B. Upon detecting the selection of the UI shape control 124B, the diagramming application replaces the diagram shape 214C with the active diagram shape 112, as shown in FIG. 2B. It should be appreciated that the diagramming application may establish any type and quantity of diagram controls that act as UI triggers 130 to trigger the display of the dynamic UI 122.

For example, all diagram shapes 214A-214D may be UI triggers 130 that trigger the display of the dynamic UI 122 for replacement of the specific diagram shape 214 that triggers the dynamic UI 122. Each of the diagram shapes 214A-214D is also a trigger for displaying connection controls 218A-218C for assisting in the addition of diagram shapes 214 to the diagram 206. Each of the connection controls 218A-218C may also be a UI trigger 130 for triggering the dynamic UI 122 to assist the user in changing the type of diagram shape 214 to be subsequently added to the diagram 206. Depending on whether a diagram shape 214 triggers the dynamic UI 122, or whether a connection control 218 triggers the dynamic UI 122, a user selection of a UI shape control 124 will either change an existing diagram shape 214, or add a diagram shape 214 to the diagram 206.

Figure 3A:
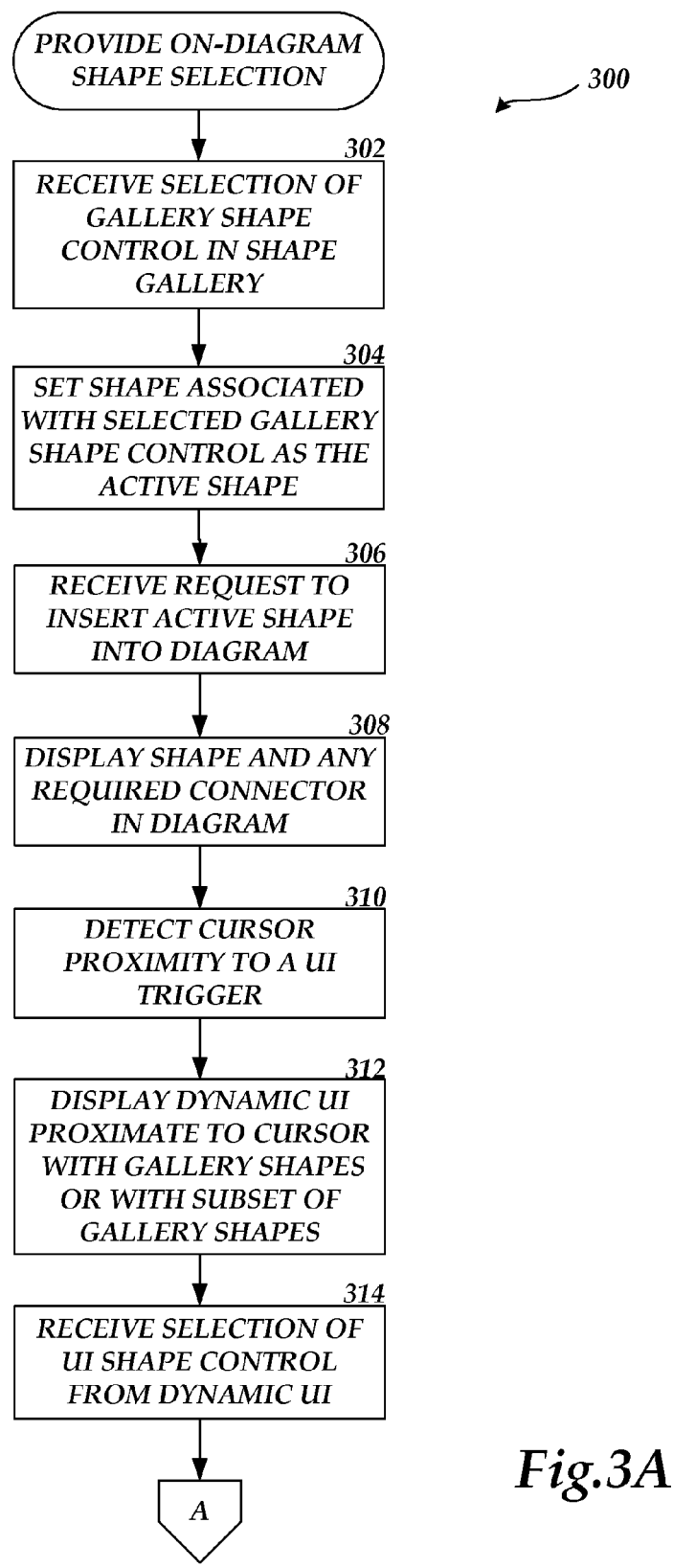
FIGS. 3A-3B are flow diagrams showing an illustrative process provided in one implementation described herein for providing on-diagram shape selection.
Figure 3B:
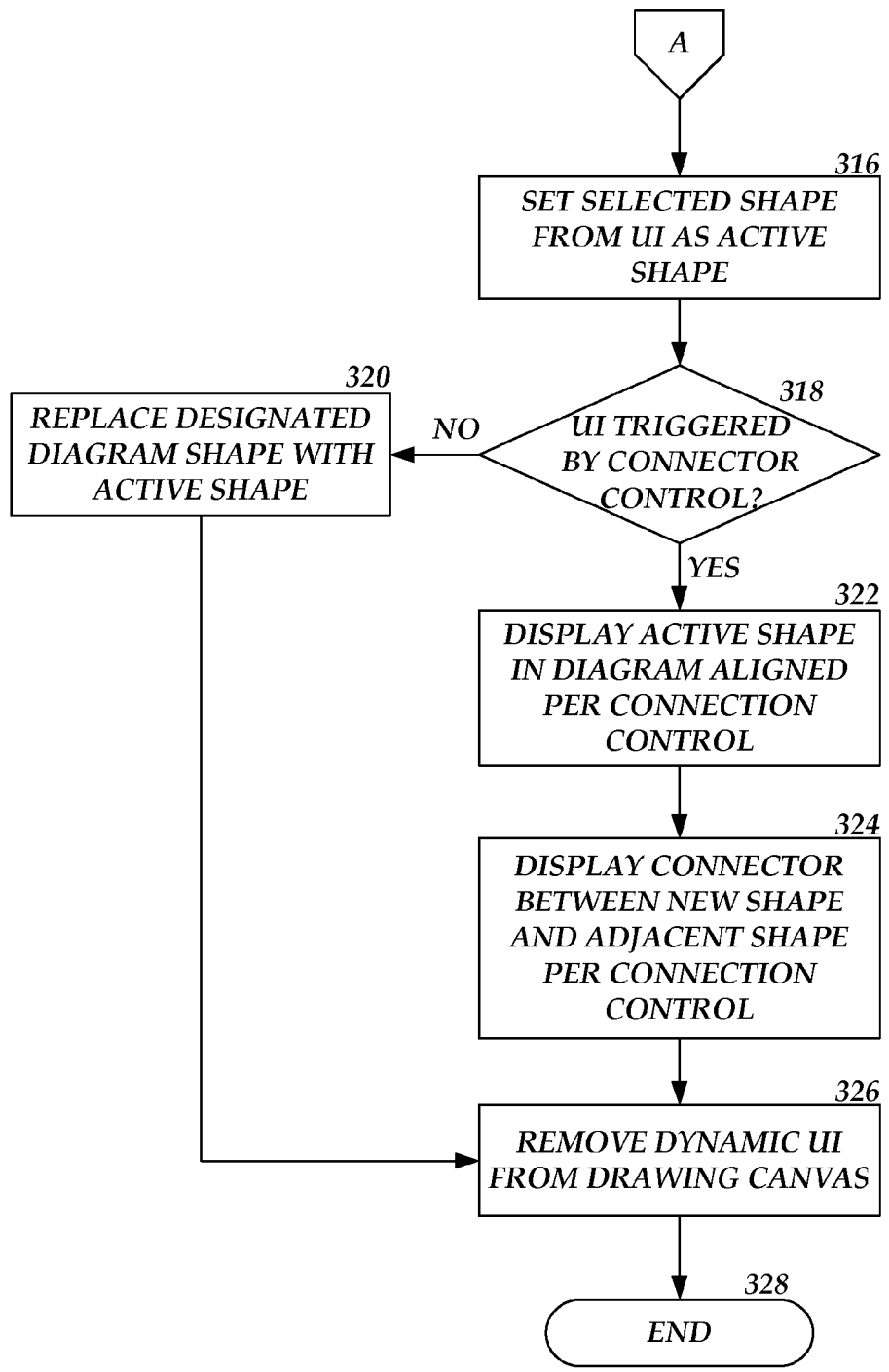

Turning now to FIGS. 3A-3B, an illustrative routine 300 will be described for providing a dynamic UI 122 within the drawing canvas 104 that allows a user to select an active diagram shape 112 while creating a diagram 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the diagramming application receives a selection of a gallery shape control 110 in the shape gallery 108. From operation 302, the routine 300 continues to operation 304, where the diagramming application sets the shape corresponding to the selected gallery shape control 110 as the active diagram shape 112. The routine continues from operation 304 to operation 306, where the diagramming application receives a request to insert the active diagram shape 112 into the diagram 106. The request may originate from a drag-and-drop action from the shape gallery 108 to the drawing canvas 104 or from a selection of a connection control 118 within the diagram 106. From operation 306, the routine 300 continues to operation 308, where the diagramming application displays the requested active diagram shape 112 and any required connectors 116 into the diagram 106. A connector 116 may be required when the user requests the diagram shape 114 via selection of the connection control 118.

The routine 300 continues from operation 308 to operation 310, where the diagramming application detects the cursor 120 moving within a threshold proximity to or hovering over a UI trigger 130. From operation 310, the routine 300 continues to operation 312, where the diagramming application displays a dynamic UI 122 proximate to the cursor 120 in response to detecting the cursor 120 near or over the UI trigger 130. As discussed above, the dynamic UI 122 may include one or all of the gallery shape controls 110A-110D within the shape gallery 108. The routine 300 continues to operation 314 from operation 312, where the diagramming application receives a selection of a UI shape control 124 corresponding to a desired diagram shape 114.

From operation 314, the routine 300 continues to operation 316, where the diagramming application sets the shape corresponding to the selected UI shape control 124 as the active diagram shape 112. The routine continues to operation 318 from operation 316, where the diagramming application determines whether the UI trigger 130 that triggered the dynamic UI 122 is a connection control 118. If the UI trigger 130 is not a connection control 118, and is therefore a diagram shape 114, then the routine 300 proceeds to operation 320, where the diagramming application replaces the designated diagram shape 114 with the active diagram shape 112. From operation 320, the routine 300 continues to operation 326 and proceeds as described below.

However, if at operation 318, the diagramming application determines that the UI trigger 130 is a connection control 118, then the routine 300 continues to operation 322, where the diagramming application displays the active diagram shape 112 in the diagram 106. The active diagram shape 112 is aligned according to the connection control 118. For example, if the connection control 118 points to the right, then the active diagram shape 112 will be placed to the right of the associated existing diagram shape 114 and aligned. From operation 322, the routine 300 continues to operation 324, where the diagramming application displays a connector 116 within the diagram 106, between the active diagram shape 112 and the associated existing diagram shape 114. From operation 324, the routine 300 continues to operation 326, where the diagramming application removes the dynamic UI 122 from the drawing canvas 104. The routine continues to operation 328 and ends.

FIG. 4 shows an illustrative computer architecture for a computer 400 capable of executing the software components described herein for providing an in-diagram, dynamic UI 122 for receiving a selection of the active diagram shape 112 within the confines of the drawing canvas 104. The computer architecture shown in FIG. 1 illustrates a conventional desktop, laptop computer, or server computer and may be utilized to embody any aspects of the computer program described herein.

The computer architecture shown in FIG. 4 includes a central processing unit 402 (CPU), a system memory 408, including a random access memory 414 (RAM) and a read-only memory (ROM) 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 418, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). It should be appreciated that the user input operations described herein as being performed with a mouse may be performed with a keyboard, electronic stylus, or other suitable user input device. Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the diagramming application 422.

Based on the foregoing, it should be appreciated that technologies for providing a dynamic user interface (UI) to allow a user to select and change diagram shapes without leaving the drawing canvas of a flowchart or other diagram are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for selecting a diagram shape while creating a diagram, the method comprising:
    determining that a cursor is proximate to a user interface (UI) trigger on a drawing canvas adjacent to an off-canvas shape gallery, the UI trigger comprising a first diagram shape in the drawing canvas and a connection control comprising at least one selectable indicator representing a placement direction in which a second diagram shape is inserted into the diagram;
    in response to determining that the cursor is proximate to the UI trigger, displaying a dynamic UI on the drawing canvas within a minimal navigation distance of the UI trigger, the dynamic UI comprising a shape gallery having a plurality of selectable UI shape controls, wherein each selectable UI shape control corresponds to a different diagram shape that is available for placement within the diagram on the drawing canvas;
    receiving a selection of the second diagram shape from the plurality of selectable UI shape controls;
    if the UI trigger is the connection control, inserting the second diagram shape adjacent to the first diagram shape associated with the connection control, and inserting a connector between the first diagram shape and the second diagram shape; and
    if the UI trigger is the first diagram shape, replacing the first diagram shape with the second diagram shape.

2. The method of claim 1, wherein the dynamic UI comprises a plurality of diagram shapes.

3. The method of claim 1, wherein the different diagram shape available for placement within the diagram directly correlates to a different diagram shape displayed within the off-canvas shape gallery adjacent to the drawing canvas.

4. The method of claim 1, wherein the different diagram shape available for placement within the diagram is one of a subset of diagram shapes from a group of diagram shapes located in the off-canvas shape gallery adjacent to the drawing canvas.

5. A computer storage medium comprising computer-executable instructions which, when executed by a computer, will cause the computer to:
    determine that a cursor is proximate to a user interface (UI) trigger on a drawing canvas adjacent to an off-canvas shape gallery, the UI trigger comprising a first diagram shape in the drawing canvas and a connection control comprising at least one selectable indicator representing a placement direction in which a second diagram shape is inserted into the diagram;
    in response to determining that the cursor is proximate to the UI trigger, present a dynamic UI on a drawing canvas, the dynamic UI comprising an on-canvas shape gallery having a plurality of selectable UI shape controls, wherein each selectable UI shape control corresponds to a different diagram shape that is available for placement within a diagram on the drawing canvas;
    receive a selection of the second diagram shape from the plurality of selectable UI shape controls from the on-canvas shape gallery via the dynamic UI;
    if the trigger is the connection control, insert the second diagram shape adjacent to the first diagram shape associated with the connection control, and insert a connector between the first diagram shape and the second diagram shape; and
    if the UI trigger is the first diagram shape, replace the first diagram shape with the second diagram shape.

6. The computer storage medium of claim 5, wherein the different diagram shape available for placement within the diagram directly correlates to a different diagram shape displayed within the off-canvas shape gallery adjacent to the drawing canvas.

7. The computer storage medium of claim 5, wherein the different diagram shape available for placement within the diagram is one of a subset of diagram shapes from a group of diagram shapes located in the off-canvas shape gallery adjacent to the drawing canvas.

8. The computer storage medium of claim 5, further comprising computer-executable instructions which, when executed by a computer, will cause the computer to:
    determine that a cursor is proximate to an active shape on the drawing canvas;
    in response to determining that the cursor is proximate to the active shape, display the dynamic UI on the drawing canvas;
    receive a selection of a secondary UI shape control via the dynamic UI; and
    replace the active shape with a diagram shape corresponding to the selection of the secondary UI shape control.

9. A method for selecting an active diagram shape while creating a diagram, the method comprising:
    receiving a user selection of the active diagram shape from an off-canvas shape gallery;
    receiving a request to display the active diagram shape within the diagram;
    in response to receiving the request to display the active diagram shape within the diagram, displaying the active diagram shape within the diagram;
    determining that a cursor is proximate to a first trigger comprising a connection control trigger user interface (UI) associated with the active diagram shape displayed on a drawing canvas, the connection control trimer UI comprising a selectable indicator representing a direction in which a new diagram shape is to be inserted into the diagram when the connection control trigger UI is selected;
    in response to determining that the cursor is proximate to the connection control trigger UI, displaying a dynamic UI on the drawing canvas proximate to the cursor, the dynamic UI comprising an on-canvas shape gallery comprising a plurality of selectable UI shape controls available for placement within the diagram on the drawing canvas, the plurality of selectable UI shape controls corresponding to a plurality of gallery shape controls located within an off-canvas shape gallery adjacent to the drawing canvas;

determining that the cursor is proximate to a second trigger comprising an active diagram shape trigger UI on the drawing canvas;

in response to determining that the cursor is proximate to the active diagram shape trigger UI, displaying the dynamic UI on the drawing canvas proximate to the cursor;

receiving a selection of a UI shape control from the plurality of selectable UI shape controls via the dynamic UI;

upon receiving the selection of the UI shape control displayed in response to the cursor being proximate to the first trigger, inserting a diagram shape corresponding to the selected UI shape control into the diagram in the direction represented by the selectable indicator; and upon receiving the selection of the UI shape control displayed in response to the cursor being proximate to the second trigger, replacing the active diagram shape with a diagram shape corresponding to the selection of the UI shape control selected via the dynamic UI.

* * * * *